United States Patent
Malladi et al.

(10) Patent No.: US 9,445,410 B2
(45) Date of Patent: Sep. 13, 2016

(54) COMMUNICATING WITH AN ENHANCED NEW CARRIER TYPE

(71) Applicant: QUALCOMM Incorporated, San Diego, CA (US)

(72) Inventors: Durga Prasad Malladi, San Diego, CA (US); Yongbin Wei, San Diego, CA (US); Peter Gaal, San Diego, CA (US); Gavin Bernard Horn, La Jolla, CA (US); Hao Xu, San Diego, CA (US); Tao Luo, San Diego, CA (US); Aleksandar Damnjanovic, Del Mar, CA (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 195 days.

(21) Appl. No.: 13/957,339

(22) Filed: Aug. 1, 2013

(65) Prior Publication Data
US 2014/0036812 A1 Feb. 6, 2014

Related U.S. Application Data

(60) Provisional application No. 61/679,618, filed on Aug. 3, 2012.

(51) Int. Cl.
*H04W 72/04* (2009.01)
*H04W 52/02* (2009.01)
*H04L 5/00* (2006.01)
(Continued)

(52) U.S. Cl.
CPC ............ *H04W 72/042* (2013.01); *H04L 5/001* (2013.01); *H04L 5/0053* (2013.01); *H04L 5/0087* (2013.01); *H04W 24/02* (2013.01); *H04W 52/0206* (2013.01); *H04L 5/0023* (2013.01); *H04L 5/0032* (2013.01); *H04W 76/046* (2013.01); *Y02B 60/50* (2013.01)

(58) Field of Classification Search
None
See application file for complete search history.

(56) References Cited

U.S. PATENT DOCUMENTS

| 8,422,506 B2 | 4/2013 | Wang et al. |
| 8,446,844 B1 | 5/2013 | Dinan |
| 8,902,830 B2 * | 12/2014 | Nimbalker et al. .......... 370/329 |

(Continued)

FOREIGN PATENT DOCUMENTS

WO 2010002991 A1 1/2010

OTHER PUBLICATIONS

3rd Generation Partnership Project; Technical Specification Group Radio Access Network; Evolved Universal Terrestrial Radio Access (E-UTRA); Potential solutions for energy saving for E-UTRAN (Release 10), 3GPP Standard; 3GPP TR 36.927, 3rd Generation Partnership Project (3GPP), Mobile Competence Centre; 650, Route Des Lucioles; F-06921 Sophia-Antipolis Cedex; France, vol. RAN WG3, No. V10.1.0, 26 Sep. 2011, pp. 1-22, XP050554061, [retrieved on Sep. 26, 2011].

(Continued)

*Primary Examiner* — Huy D Vu
*Assistant Examiner* — James P Duffy
(74) *Attorney, Agent, or Firm* — Seyfarth Shaw LLP

(57) ABSTRACT

A method of wireless communication is presented for an enhanced new carrier type cell. The method includes transmitting downlink common signals and channels at a low duty cycle while in a dormant state. The method also includes transmitting downlink common signals and channels at a high duty cycle while in an active state.

34 Claims, 18 Drawing Sheets

(51) Int. Cl.
*H04W 24/02* (2009.01)
*H04W 76/04* (2009.01)

(56) References Cited

U.S. PATENT DOCUMENTS

| | | | |
|---|---|---|---|
| 2009/0252075 A1 | 10/2009 | Ji et al. | |
| 2010/0002614 A1 | 1/2010 | Subrahmanya | |
| 2010/0046433 A1* | 2/2010 | Iwamura et al. | 370/328 |
| 2010/0110979 A1* | 5/2010 | Chen | H04W 52/0225 370/328 |
| 2011/0053490 A1 | 3/2011 | Wu | |
| 2012/0287877 A1 | 11/2012 | Han et al. | |
| 2013/0128788 A1 | 5/2013 | Guey et al. | |

OTHER PUBLICATIONS

Partial International Search Report—PCT/US2013/053488—ISA/EPO—Nov. 11, 2013.
Taiwan Search Report—TW102127832—TIPO—Oct. 15, 2015.
International Search Report and Written Opinion—PCT/US2013/053488—ISA/EPO—Mar. 27, 2014.

* cited by examiner

COMMUNICATING WITH AN ENHANCED NEW CARRIER TYPE

CROSS-REFERENCE TO RELATED APPLICATION

This application claims the benefit under 35 U.S.C. §119(e) to U.S. Provisional Patent Application No. 61/679,618 entitled "COMMUNICATING WITH AN ENHANCED NEW CARRIER TYPE," filed on Aug. 3, 2012, the disclosure of which is expressly incorporated by reference herein in its entirety.

BACKGROUND

1. Field

Aspects of the present disclosure relate generally to wireless communication systems, and more particularly to various design elements for an enhanced new carrier type.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

In one aspect of the present disclosure, a method of wireless communication is presented. The method includes transmitting downlink common signals and channels at a low duty cycle while in a dormant state. The method also includes transmitting downlink common signals and channels at a high duty cycle while in an active state.

Another aspect of the present disclosure is directed to an apparatus including means for transmitting downlink common signals and channels at a low duty cycle while in a dormant state. The apparatus also includes means for transmitting downlink common signals and channels at a high duty cycle while in an active state.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of transmitting downlink common signals and channels at a low duty cycle while in a dormant state. The program code also causes the processor(s) to transmit downlink common signals and channels at a high duty cycle while in an active state.

Another aspect discloses wireless communication having a memory and at least one processor coupled to the memory. The processor(s) is configured to transmit downlink common signals and channels at a low duty cycle while in a dormant state. The processor(s) is further configured to transmit downlink common signals and channels at a high duty cycle while in an active state.

In one aspect of the present disclosure, a method of wireless communication is presented. The method includes receiving a trigger. The method also includes switching the cell between an active state and a dormant state based on the received trigger.

Another aspect of the present disclosure is directed to an apparatus including means for receiving a trigger. The apparatus also includes means for switching the cell between an active state and a dormant state based on the received trigger.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of receiving a trigger. The program code also causes the processor(s) to switch the cell between an active state and a dormant state based on the received trigger.

Another aspect discloses wireless communication having a memory and at least one processor coupled to the memory. The processor(s) is configured to receive a trigger. The processor(s) is further configured to switch the cell between an active state and a dormant state based on the received trigger.

In one aspect of the present disclosure, a method of wireless communication is presented. The method includes connecting to a legacy carrier type cell to obtain system information. The method also includes transitioning to a dormant enhanced new carrier type cell based on the obtained system information.

Another aspect of the present disclosure is directed to an apparatus including means for connecting to a legacy carrier type cell to obtain system information. The apparatus also includes means for transitioning to a dormant enhanced new carrier type cell based on the obtained system information.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of connecting to a legacy carrier type cell to obtain system information. The program code also causes the processor(s) to transition to a dormant enhanced new carrier type cell based on the obtained system information.

Another aspect discloses wireless communication having a memory and at least one processor coupled to the memory. The processor(s) is configured to connect to a legacy carrier type cell to obtain system information. The processor(s) is further configured to transition to a dormant enhanced new carrier type cell based on the obtained system information.

In one aspect of the present disclosure, a method of wireless communication is presented. The method includes transitioning from an off state to an idle state. The method also includes connecting to an active enhanced new carrier type without first attaching to a legacy carrier type.

Another aspect of the present disclosure is directed to an apparatus including means for transitioning from an off state to an idle state. The apparatus also includes means for connecting to an active enhanced new carrier type without first attaching to a legacy carrier type.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of transitioning from an off state to an idle state. The program code also causes the processor(s) to connect to an active enhanced new carrier type without first attaching to a legacy carrier type.

Another aspect discloses wireless communication having a memory and at least one processor coupled to the memory. The processor(s) is configured to transition from an off state to an idle state. The processor(s) is further configured to connect to an active enhanced new carrier type without first attaching to a legacy carrier type.

In one aspect of the present disclosure, a method of wireless communication is presented. The method includes receiving a physical random access channel signal. The method also includes switching between a new carrier type mode and a legacy carrier type mode based on the received physical random access channel signal.

Another aspect of the present disclosure is directed to an apparatus including means for receiving a physical random access channel signal. The apparatus also includes means for switching between a new carrier type mode and a legacy carrier type mode based on the received physical random access channel signal.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of receiving a physical random access channel signal. The program code also causes the processor(s) to switch between a new carrier type mode and a legacy carrier type mode based on the received physical random access channel signal.

Another aspect discloses wireless communication having a memory and at least one processor coupled to the memory. The processor(s) is configured to receive a physical random access channel signal. The processor(s) is further configured to switch between a new carrier type mode and a legacy carrier type mode based on the received physical random access channel signal.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
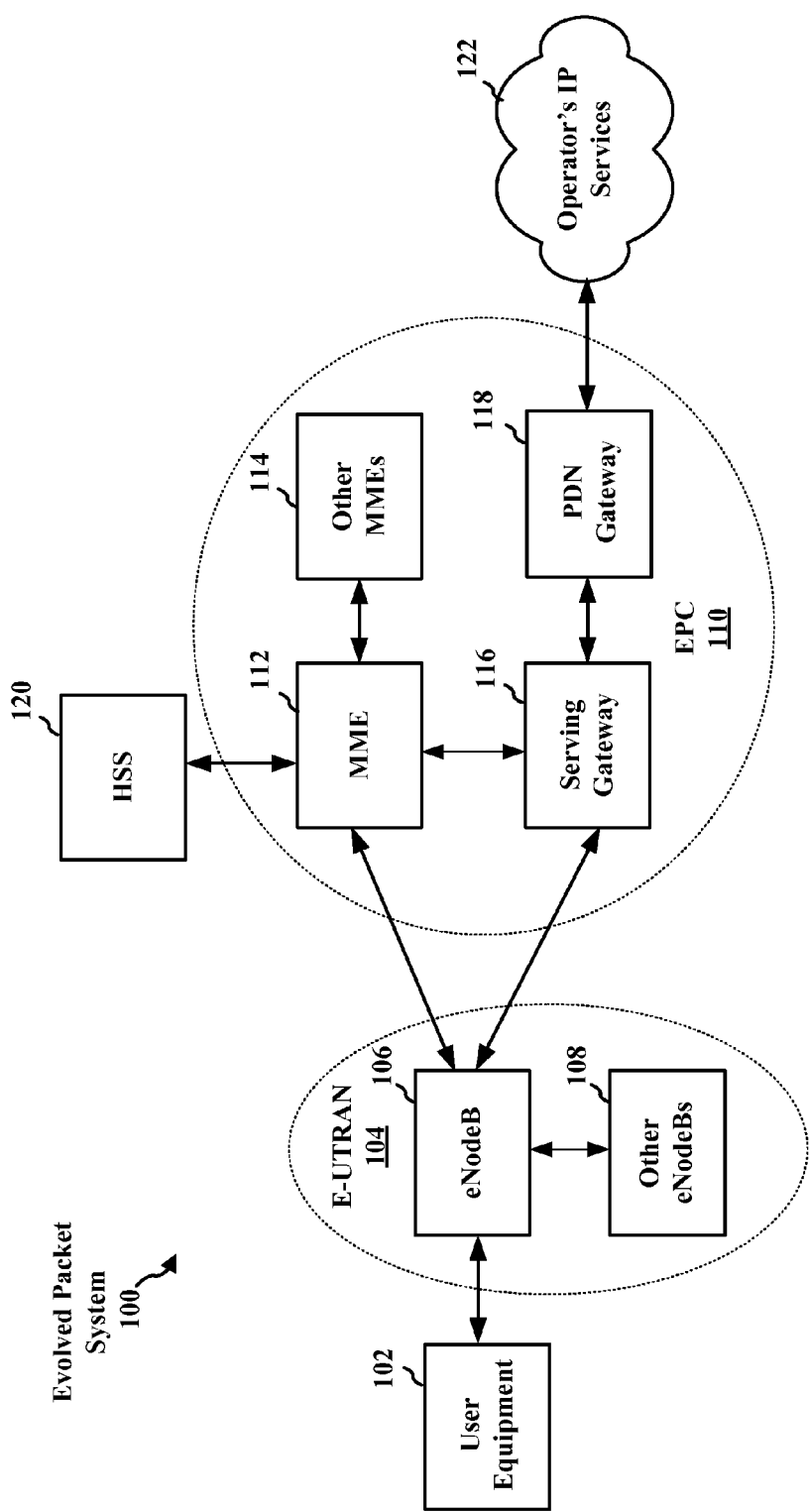
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
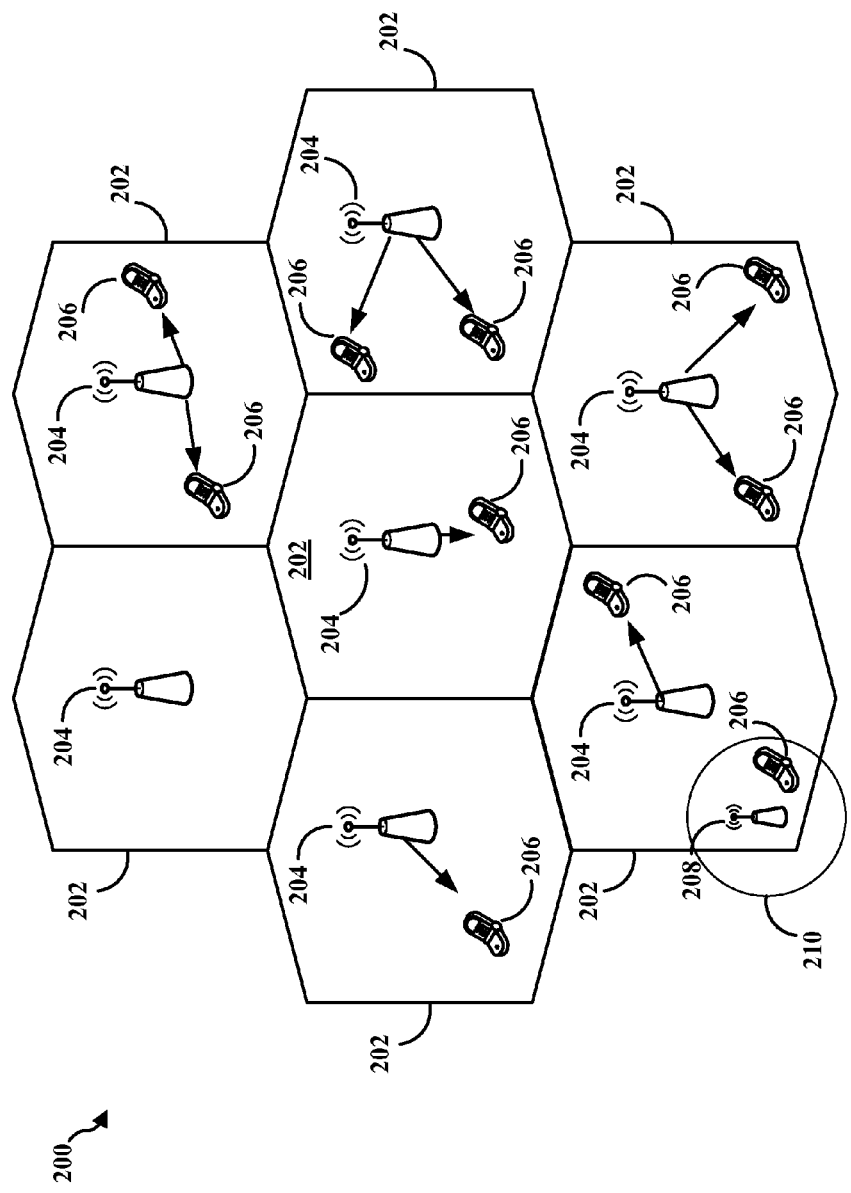
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
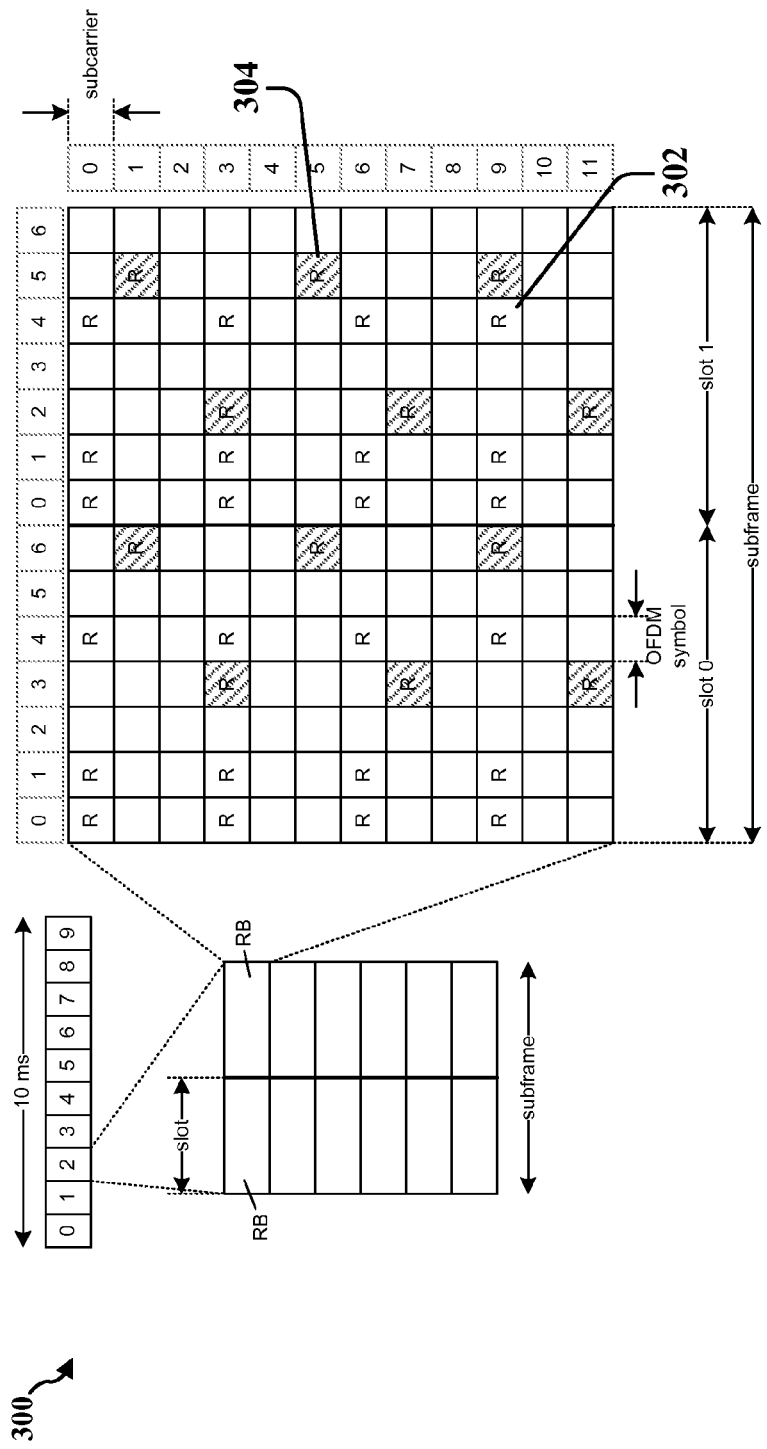
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, for a total of 84 resource elements. For an extended cyclic prefix, a resource block contains 6 consecutive OFDM symbols in the time domain, resulting in 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
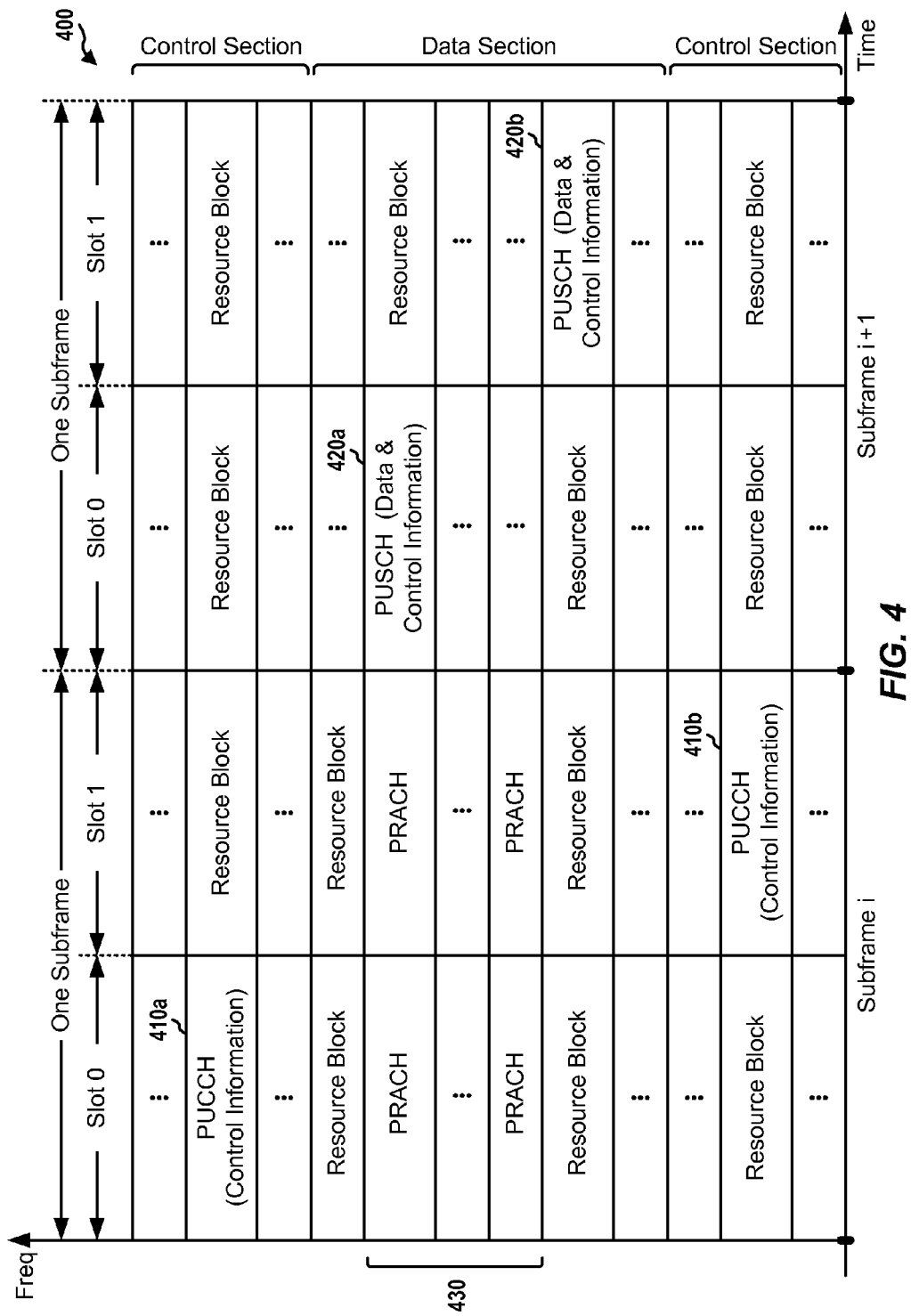
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
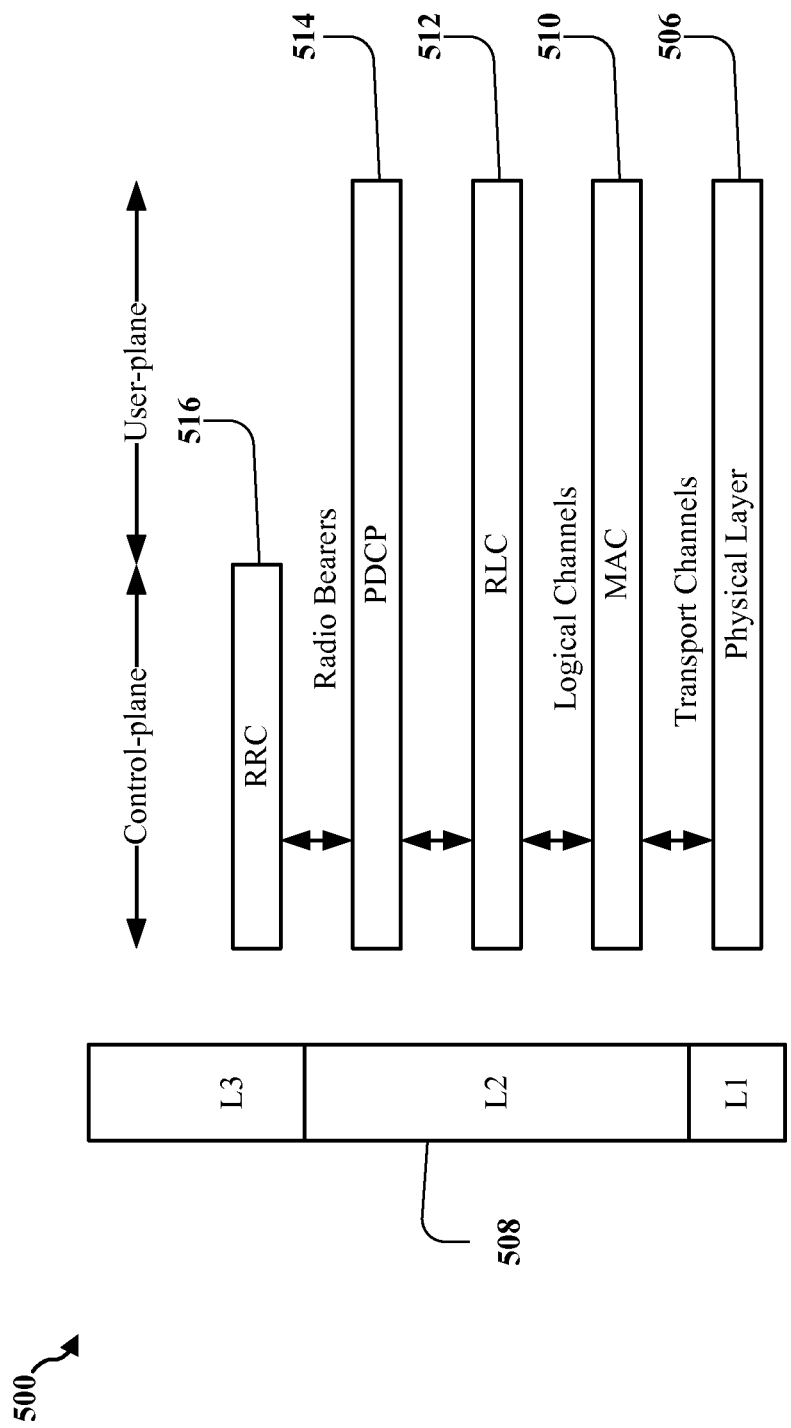
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
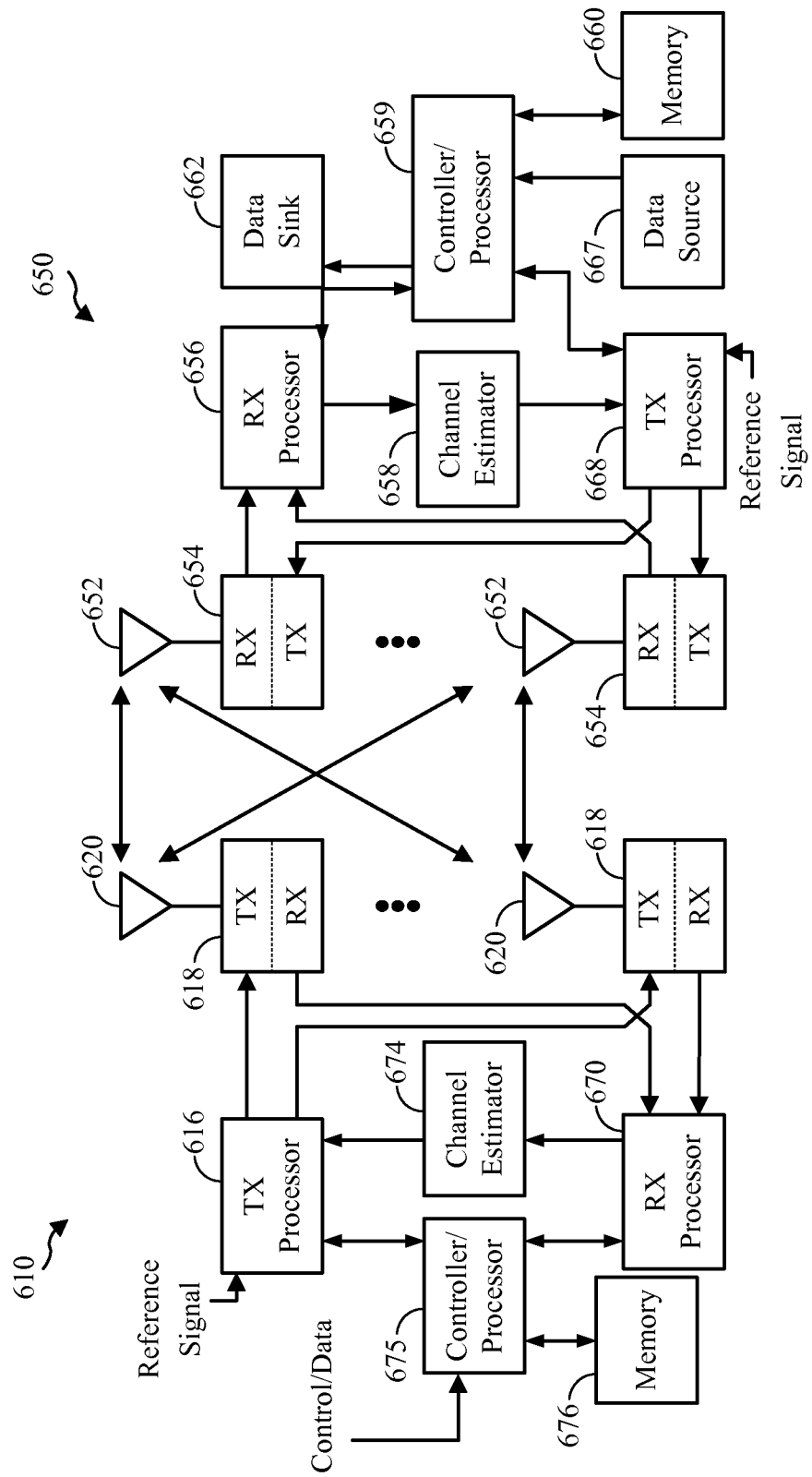
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Design Elements for an Enhanced New Carrier Type (eNCT)

A dense network may include numerous transmitting nodes, such as pico nodes, remote radio heads (RRHs), and/or femto nodes, in each macro cell area. Because the dense network includes various types of nodes, there exists a need for an energy efficient infrastructure. The dense network may be referred to as a hyper dense network. Typically user equipments (UEs) specify a need for sparse common signaling. Sparse waveforms are suited for partially loaded networks, such as when the eNodeB to UE ratio is approximately one to one.

Compact and sparse signaling may reduce or minimize the state transition times when the traffic is bursty. In one example, the transition states may include: wake up from off state, complete transaction, and go back to off state.

One aspect of the present disclosure is directed to authorized shared access (ASA). Incumbents may impose interference restrictions on the authorized shared access spectrum. Licensees use the underutilized authorized shared access spectrum of incumbents. Sparse waveforms may reduce licensee and incumbent interference in partial loading scenarios. Conversely, more licensee nodes can operate with sparse waveforms under the same interference limitations.

An enhanced new carrier type (eNCT) has been proposed for LTE systems. The enhanced new carrier type is derived from a sparse waveform based design. The enhanced new carrier type is a container for all physical (PHY) and procedural changes. The legacy carrier type supports legacy UEs. That is, UEs capable of Release 8 LTE and beyond can attach to the legacy carrier type.

The discontinuous transmission (DTX) version of the legacy carrier type may be specified for energy efficiency. Still, discontinuous transmission is not specified for the enhanced new carrier type. Additionally, discontinuous transmission alone may not address problems related to state transitions.

A network may include two layers. The base legacy carrier type layer supports legacy LTE devices, such as devices capable of releases equal to or prior to LTE Release 11, and new LTE devices, such as capable of LTE Release 12 and beyond. The enhanced new carrier type layer supports only new LTE devices in standalone mode. The network is deployed in a system frame number (SFN) synchronous manner across nodes within a layer and across layers.

According to aspects of the present disclosure, a cell may be defined as layer 1 (L1) cell based on three parameters. The three parameters include physical cell ID (PCI), carrier frequency, and carrier type. A cell is uniquely identified by its cell global identification (CGI). Detection includes timing information, a unique ID, and/or additional information.

The enhanced new carrier type is configured to have backward compatibility, and accordingly, each enhanced new carrier type capable UE is also capable of associating with the legacy carrier type. Release 10 carrier aggregation capable legacy carrier type UEs may be cross-carrier scheduled to the enhanced new carrier type. In this case, the primary component carrier (PCC) is for the legacy carrier type and the secondary component carrier (SCC) is for the enhanced new carrier type.

In another aspect of the present disclosure, a cell is configured to switch between the enhanced new carrier type and legacy carrier type based on a triggering event. The triggering event may include, but is not limited to, the type of UEs, load, a random access channel (RACH) message, or other event.

In one configuration, the triggering event may be a UE detection signal (UDS). In another configuration, the trigger is a handover message transmitted by a serving cell. The UE detection signal may include a sounding reference signal (SRS) or a random access signal, such as a physical random access channel (PRACH) signal. The random access signal may be transmitted in response to a control channel message received at the UE from a serving cell. The control channel message may be a physical downlink control channel (PDCCH) message.

According to an aspect of the present disclosure, the UE detection signal is mapped to a shared uplink channel, such as the physical uplink shared channel (PUSCH). The mapping may be based on randomized resource block locations.

In yet another configuration, the cell switches between a new carrier type mode and a legacy carrier type mode based at least the received random access channel signal. As previously discussed, the random access signal may be transmitted in response to a control channel message received at the UE from a serving cell. The control channel message may be a physical downlink control channel message.

Figure 7:
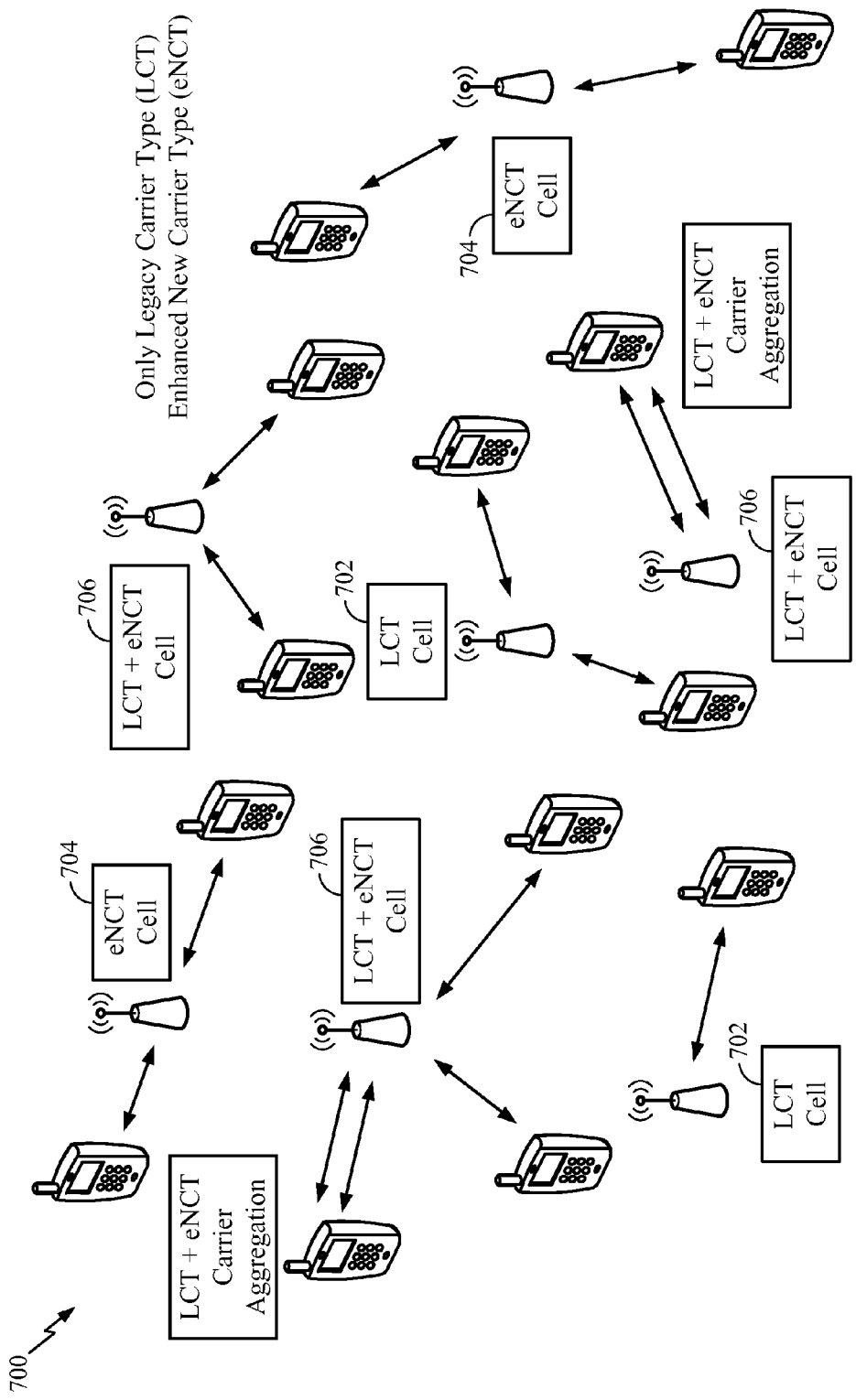
FIG. 7 is a diagram illustrating a network with various carrier type cells.

FIG. 7 is a diagram illustrating a network having both legacy carrier types and enhanced new carrier types. In particular, the network 700 includes legacy carrier type cells 702, enhanced new carrier type cells 704 and cells 706 that work with both the legacy carrier type and the enhanced new carrier type. The cells 702, 704, 706 may include a macro cell, a remote radio head (RRH), a femto cell, a pico cell, or a micro cell.

Figures 8A, 8B:
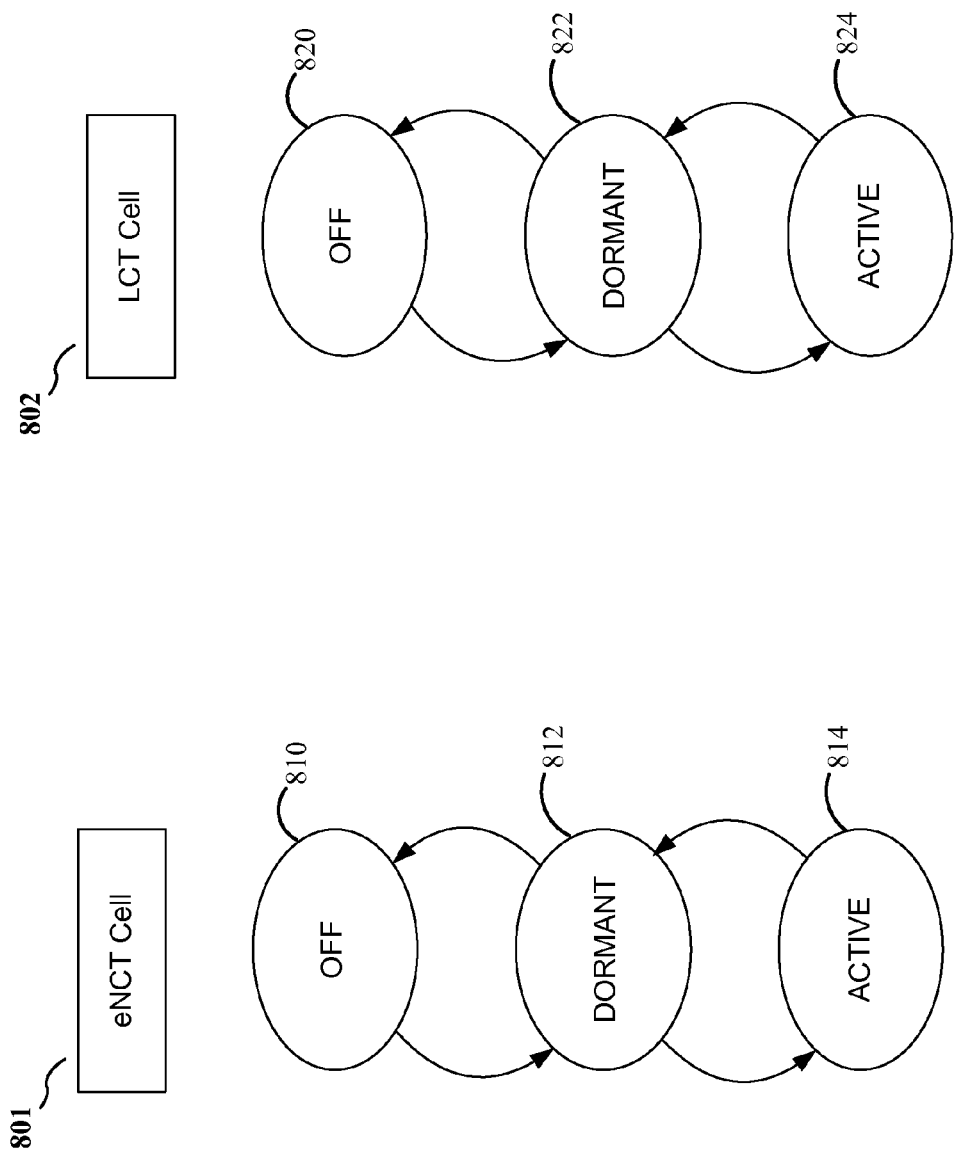
FIGS. 8A and 8B are state diagrams illustrating various states for the enhanced new carrier type (eNCT) or legacy carrier type (LCT) cells.

As illustrated in FIG. 8A, the enhanced new carrier type cells may be configured to include various cell states. In particular, an enhanced new carrier type cell 801 includes an off state 810, a dormant state 812, and an active state 814. In the off state 810, the enhanced new carrier type cell is incapable of detecting a UE or being detected by a UE.

When an enhanced new carrier type cell transitions to a dormant state 812, the rate of an enhanced new carrier type cell's transmissions/receptions may be reduced. In particular, the enhanced new carrier type cell is configured to have periodic low duty cycle (LDC) transmission of downlink common signals and channels. The enhanced new carrier type may also be configured with a periodic low duty cycle reception for uplink detection signals and channels. Further, the timing and periodicity of the transmissions can be slaved to the downlink. That is, after a transmission, the device waits for a response, remaining awake beyond the time specified for only transmitting the downlink information. In one configuration, the common signals and channels transmitted at the low duty cycle may include synchronization signals, physical broadcast channels, common reference signals, and/or cell detection signals (CDSs).

Examples of the enhanced new carrier type cell dormant state configurations are as follows. In particular, an example of the periodicity for the low duty cycle of the enhanced new carrier type in the dormant state is {80, 160, 320, . . . , 5120} ms. When transmitting in the dormant state, the enhanced new carrier type cell may transmit similar signals as the legacy carrier type cell such as narrowband synchronization signals (i.e., primary synchronization signal (PSS)/secondary synchronization signal (SSS)) that provide symbols, subframes, radio frame timing and/or physical cell ID.

The enhanced new carrier type may also transmit a broadcast channel to provide subframe number timing and broadband common reference signal (CRS) transmissions. Additionally, the enhanced new carrier type cell in the dormant state can transmit a cell detection signal (CDS), which may be referred to as "SIB1-lite." The cell detection signal may also provide a unique cell ID and/or access parameters. The cell detection signal is mapped to a downlink shared channel without a corresponding downlink control channel. This implicit mapping may include the resource block (RB) location as a function of physical cell ID and the known modulation coding scheme (MCS).

In the active state 814, the enhanced new carrier type cells include a periodic high duty cycle (HDC) transmission of common signals and channels, as well as user specific control and data transmission. The uplink communications, for the enhanced new carrier type cell in the active state, include user specific control and data reception.

In one configuration, the common signals and channels transmitted at the high duty cycle include synchronization signals, physical broadcast channels (PBCHs), common reference signals (CRSs), system information blocks (SIBs), and/or data channels. That is, when transmitting in the active state, the enhanced new carrier type cell transmits similar signals as the legacy carrier type such as synchronization signals (PSS/SSS), broadcast channels, SIB1 and SIB2. Additionally, the active state enhanced new carrier type cell may transmit common reference signal with a periodicity of 5 ms. Additionally, the SIB2 may be configured to indicate the common signal/channel periodicity of dormant enhanced new carrier type cells. For example, the periodicity in dormant enhanced new carrier type cells is {80, 160, . . . , 5120} ms. The SIB2 may also be configured to convey bandwidth and transmission (Tx) antenna parameters of dormant enhanced new carrier type cells.

FIG. 8B illustrates the various states of a legacy carrier type cell 802. In particular, the legacy carrier type cell 802 is configured to include an off state 820, a dormant state 822, and an active state 824. In the off state 820, the legacy carrier type cell is incapable of detecting a UE or being detected by a UE.

In the dormant state 822, the legacy carrier type is configured to have periodic reception of uplink signals from the UEs in a connected state with neighbor cells. The uplink signals may be based on the legacy carrier type and may include random access channel procedures triggered by a downlink control channel transmission of a neighboring serving cell, periodic or aperiodic sounding reference signal (SRS), periodic uplink control channel transmissions, and/or interference over thermal (IoT) measurements. In the active state 824, the legacy carrier type cell follows Release 8 operation.

The enhanced new carrier type and legacy carrier type cells are configured to have a bootstrapped mode and a standalone mode. In the bootstrapped mode, the UE can transition from an off state to an idle state. To operate with the enhanced new carrier type, the UE may associate with a legacy carrier type cell when the UE is in an idle state. When associated with the legacy carrier type cell, the UE may ricochet off the legacy carrier type cell while in idle state and transition to a connected state on a dormant enhanced new carrier type cell.

In one configuration, when in the bootstrapped mode, the UE may obtain system information for the dormant enhanced carrier type cell from the legacy carrier type cell. The system information may include channel periodicity, timing information, bandwidth information, and/or antenna information.

Additionally, in the bootstrapped mode, the enhanced new carrier type is subframe number synchronous with the legacy carrier type. The legacy carrier type provides information relevant to operating on the enhanced new carrier type, such as, but not limited to coarse radio frame timing (PSS, SSS), subframe number timing (PBCH), common signal/channel periodicity of dormant enhanced new carrier type cells, and/or enhanced new carrier type bandwidth and transmit antenna parameters. An example of periodicity in dormant enhanced new carrier type cells is {80, 160, . . . , 5120} ms. The bootstrapped mode also allows for carrier aggregation operation with a mix of legacy carrier type and enhanced new carrier type carriers.

In the standalone mode, the UE transitions from an off state to an idle state. In this configuration, when in the standalone mode, the UE does not have to attach to the network on the legacy carrier type to operate on the enhanced new carrier type. That is, the idle state UE may directly associate with an active enhanced new carrier type cell. The active enhanced new carrier type cells transmit information relevant for detection of dormant enhanced new carrier type cells. Additionally, the standalone mode allows for carrier aggregation operation with a combination of legacy carrier type and enhanced new carrier type carriers when the timing is coarsely aligned.

Another aspect of the present disclosure is directed to dormant cell detection by UEs. In particular, an idle UE can detect a dormant enhanced new carrier type cell. However, an idle UE cannot detect a dormant legacy carrier type cell. Additionally, connected UEs can detect a dormant enhanced new carrier type cell. However, a connected UE cannot detect a dormant legacy carrier type cell.

In one aspect of dormant enhanced new carrier type cell detection by UEs, the dormant enhanced new carrier type layer parameters are signaled to the UE. The parameters may be signaled on SIB2 of active legacy carrier type or enhanced new carrier type cells. The common signal and channel periodicity in dormant enhanced new carrier type cells may be {40, 80, 160, . . . , 5120} ms. Optionally, the bandwidth and transmission (Tx) antenna parameters may also be signaled to the UE.

A UE can detect dormant enhanced new carrier type cells using low duty cycle signals and channels, such as synchronization signals (PSS/SSS) that include timing and the physical cell identification (PCI). In one configuration, the UE can use PBCH (e.g., bandwidth and transmission parameters) to detect dormant enhanced new carrier type cells. In another configuration, a UE can detect dormant enhanced new carrier type cells using the common reference signal (CRS) and/or cell detection signals (CDSs).

Another aspect is directed to the detection of UEs by dormant cells. A dormant legacy carrier type cell can detect a connected UE, but not an idle UE. A dormant enhanced new carrier type cell can detect an idle UE (i.e., enhanced new carrier type idle UE) and can also detect a connected UE.

Dormant legacy carrier type cells can detect connected UEs. The connected UE may transmit a signal on a random access channel, such as a physical random access channel (PRACH). The signal may include a random access preamble or similar message. The signal may be triggered by the downlink control channel of a neighbor serving cell. The dormant legacy carrier type cell may awaken upon detecting the signal transmitted on the random access channel. Traditional random access channel procedures are then followed.

The dormant enhanced new carrier type cells may detect a UE detection signal (UDS) from UEs. The UE detection signal may be transmitted on specific uplink subframes as signaled in the cell detection signal. In one configuration, the UE detection signal parameters follow the traditional random access channel procedure. In another configuration, the UE detection signal is mapped to a shared uplink channel with randomized resource block locations to reduce collisions. In this configuration, an open loop pathloss compensation is based on common reference signal measurements and includes a unique identification of the device. For the detection of UEs by dormant enhanced new carrier type cells, the UE detection signal timing is offset with respect to the cell detection signal timing. In particular, the UE detects a dormant cell and is also detected by the same dormant cell.

Figure 9:
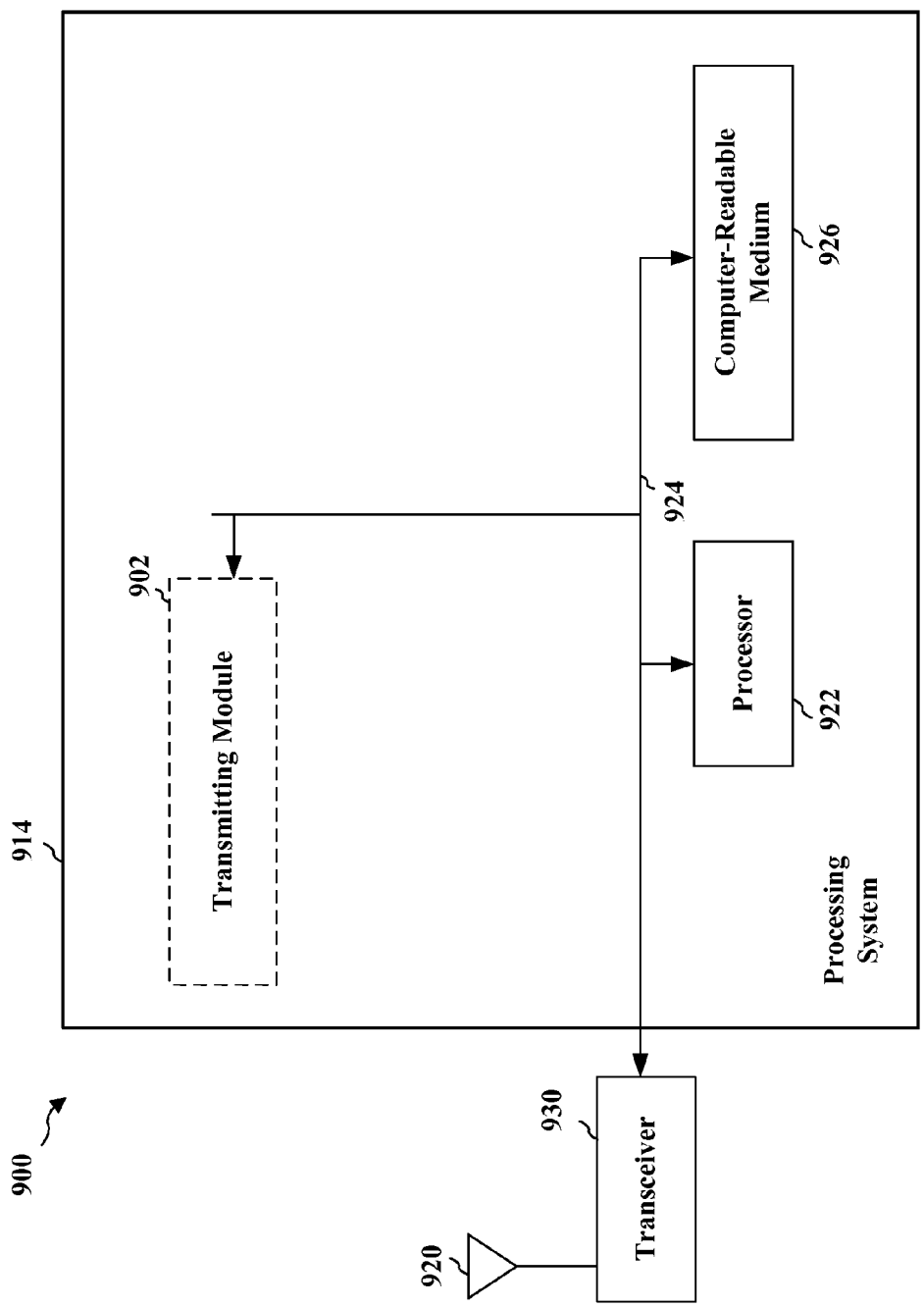
FIGS. 9, 11, 13, 15, and 17 are block diagrams illustrating different modules/means/components in an exemplary apparatus.

FIG. 9 is a diagram illustrating an example of a hardware implementation for an apparatus 900 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 922 the transmitting module 902 and the computer-readable medium 926. The bus 924 may also link various other circuits such as timing sources, peripherals, voltage regulators, and power management circuits, which are well known in the art, and therefore, will not be described any further.

The apparatus includes a processing system 914 coupled to a transceiver 930. The transceiver 930 is coupled to one or more antennas 920. The transceiver 930 enables communicating with various other apparatus over a transmission medium. The processing system 914 includes a processor 922 coupled to a computer-readable medium 926. The processor 922 is responsible for general processing, including the execution of software stored on the computer-readable medium 926. The software, when executed by the processor 922, causes the processing system 914 to perform the various functions described for any particular apparatus. The computer-readable medium 926 may also be used for storing data that is manipulated by the processor 922 when executing software.

The processing system 914 includes a transmitting module 902 for transmitting downlink common signals and channels at a low duty cycle while in a dormant state. The transmitting module may be further configured to transmit downlink common signals and channels at a high duty cycle while in an active state. The modules may be software modules running in the processor 922, resident/stored in the computer-readable medium 926, one or more hardware modules coupled to the processor 922, or some combination thereof. The processing system 914 may be a component of the eNodeB 610 and may include the memory 646, and/or the controller/processor 675.

Figure 10:
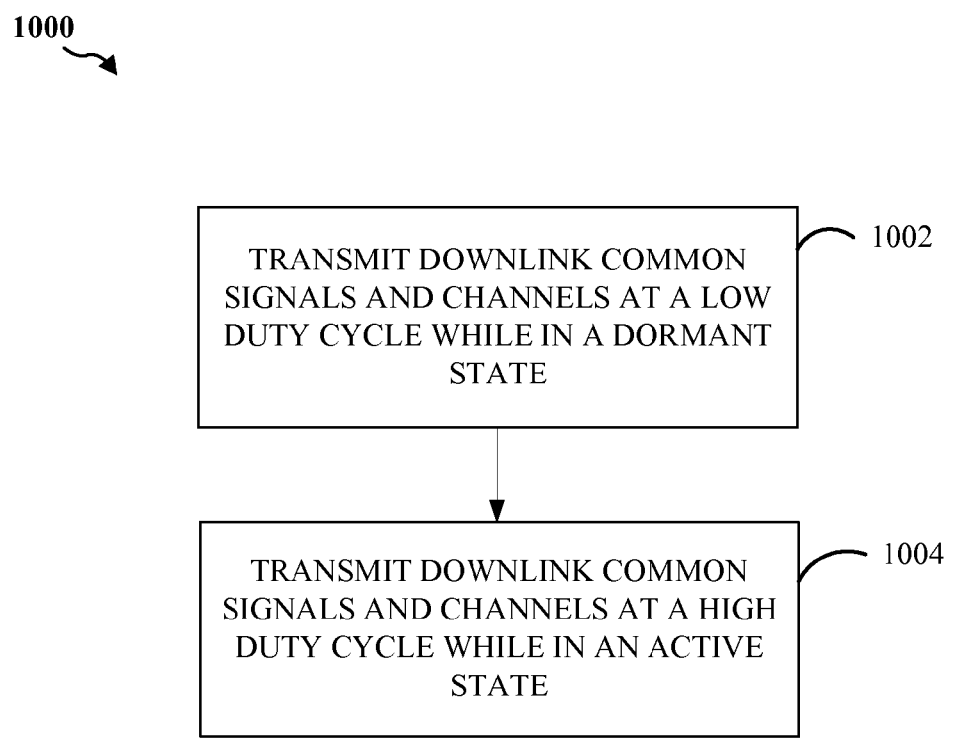
FIGS. 10, 12, 14, 16, and 18 are block diagrams illustrating different methods for wireless communication according to aspects of the present disclosure.

FIG. 10 illustrates a method 1000 for transmitting at specific duty cycles. In block 1002, an eNodeB transmitting downlink common signals and channels at a low duty cycle while in a dormant state. The eNodeB transmits downlink common signals and channels at a high duty cycle while in an active state in block 1004. As discussed above, periodicity while in the dormant state may be {40, 80, 160, . . . , 5120} ms, and periodicity while in the active state may be 5 ms or something less than the periodicity of the dormant state. However, it is understood that the particular duty cycles implemented for the low duty cycle while in the dormant state, and the high duty cycle while in the active state may depend on system design and/or deployment In one configuration, the eNodeB 610 is configured for wireless communication including means for transmitting. In one aspect, the transmitting means may be the controller/processor 675, memory 646, transmit processor 616, modulators 618, and/or antenna 620 configured to perform the functions recited by the transmitting means. In another aspect, the aforementioned means may be any module or any apparatus configured to perform the functions recited by the aforementioned means.

Figure 11:
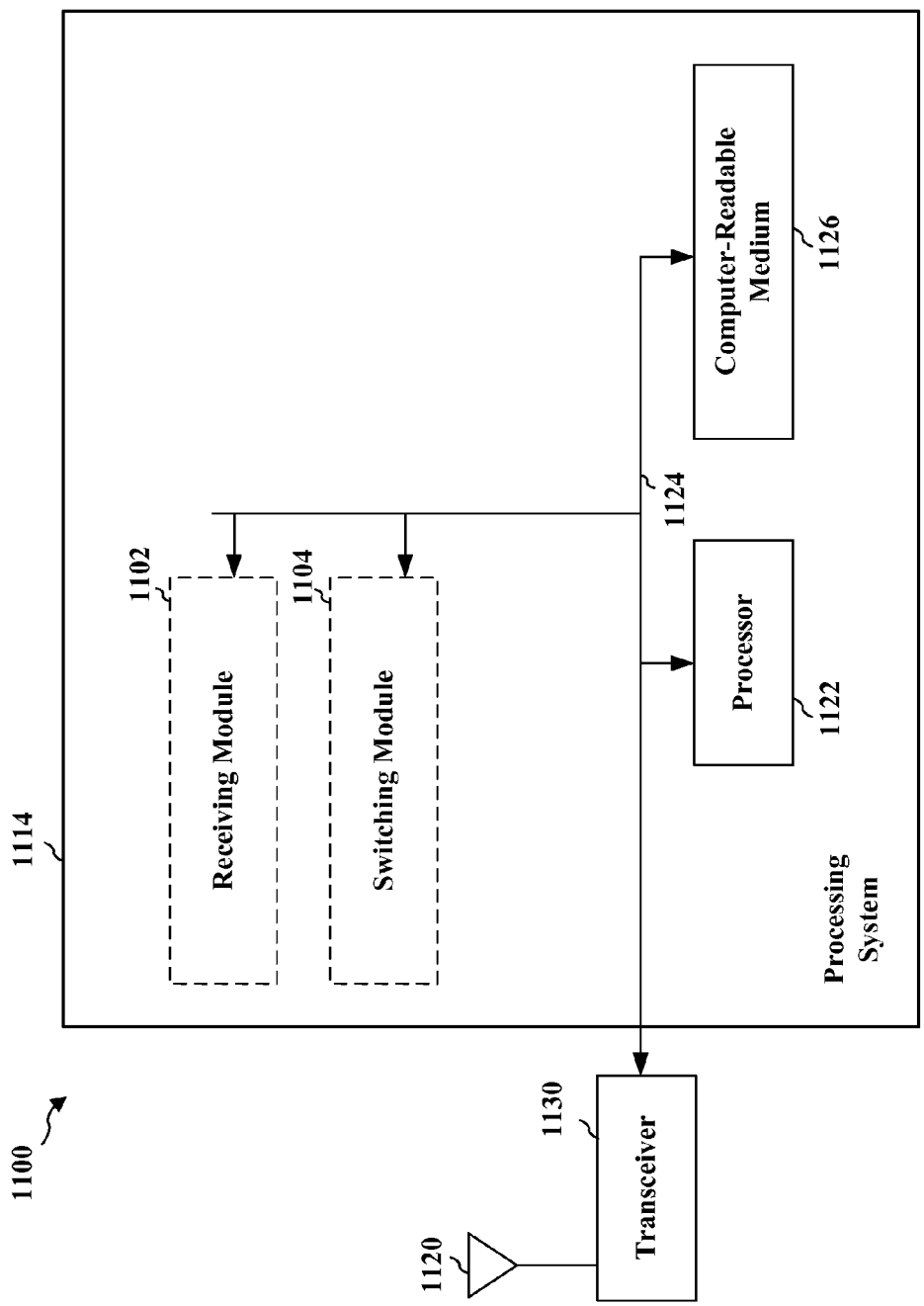

FIG. 11 is a diagram illustrating an example of a hardware implementation for an apparatus 1100 employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1122 the modules 1102, 1104 and the computer-readable medium 1126. The bus 1124 may also link various other circuits such as timing sources, peripherals, voltage regulators, and power management circuits, which are well known in the art, and therefore, will not be described any further.

The apparatus includes a processing system 1114 coupled to a transceiver 1130. The transceiver 1130 is coupled to one or more antennas 1120. The transceiver 1130 enables communicating with various other apparatus over a transmission medium. The processing system 1114 includes a processor 1122 coupled to a computer-readable medium 1126. The processor 1122 is responsible for general processing, including the execution of software stored on the computer-readable medium 1126. The software, when executed by the processor 1122, causes the processing system 1114 to perform the various functions described for any particular apparatus. The computer-readable medium 1126 may also be used for storing data that is manipulated by the processor 1122 when executing software.

The processing system 1114 includes a receiving module 1102 for receiving a trigger. The processing system 1114 also includes a switching module 1104 for switching the cell between an active state and a dormant state based on the received trigger. The modules may be software modules running in the processor 1122, resident/stored in the computer-readable medium 1126, one or more hardware modules coupled to the processor 1122, or some combination thereof. The processing system 1114 may be a component of the eNodeB 610 and may include the memory 646, and/or the controller/processor 675.

Figure 12:
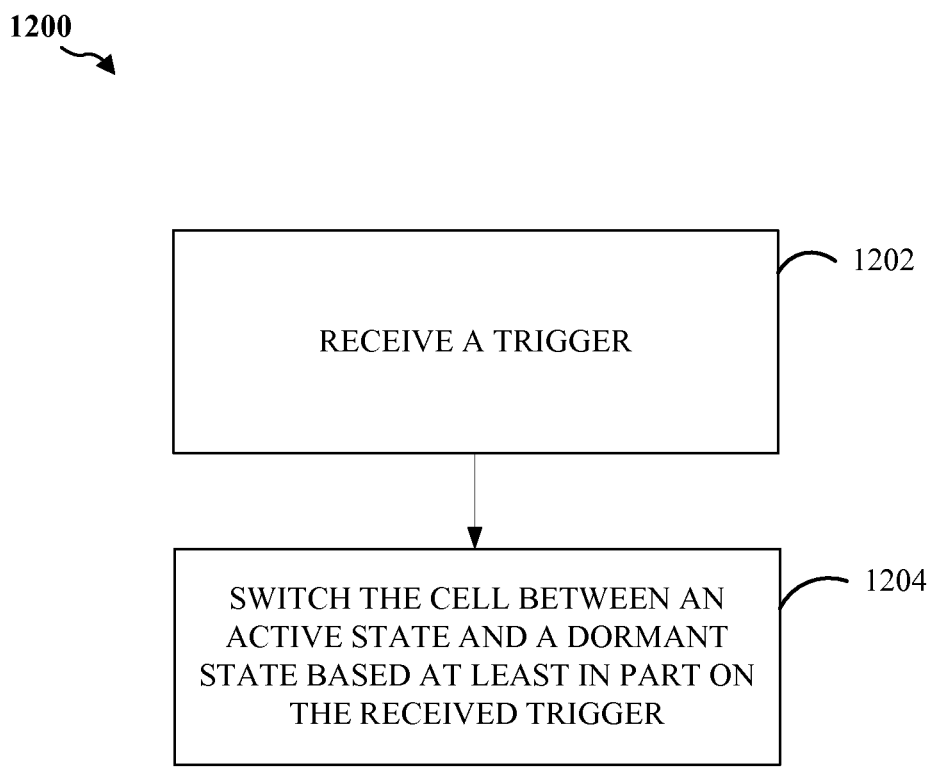

FIG. 12 illustrates a method 1200 for switching states. In block 1202, an eNodeB receives a trigger. The trigger may sent by a UE or another eNodeB. Examples of the trigger include, but are not limited to, the type of UEs, the load, a random access channel message, etc. The eNodeB switches the cell between an active state and a dormant state based at least in part on the received trigger in block 1204.

In one configuration, the eNodeB 610 is configured for wireless communication including means for receiving. In one aspect, the receiving means may be the controller/processor 675, memory 646, receive processor 670, demodulators 618, and/or antenna 620 configured to perform the functions recited by the receiving means. The eNodeB 610 may be further configured to include a means for switching. In this aspect, the switching means may be the controller/processor 675 and/or memory 646 configured to perform the functions recited by the switching means. In another aspect, the aforementioned means may be any module or any apparatus configured to perform the functions recited by the aforementioned means.

Figure 13:
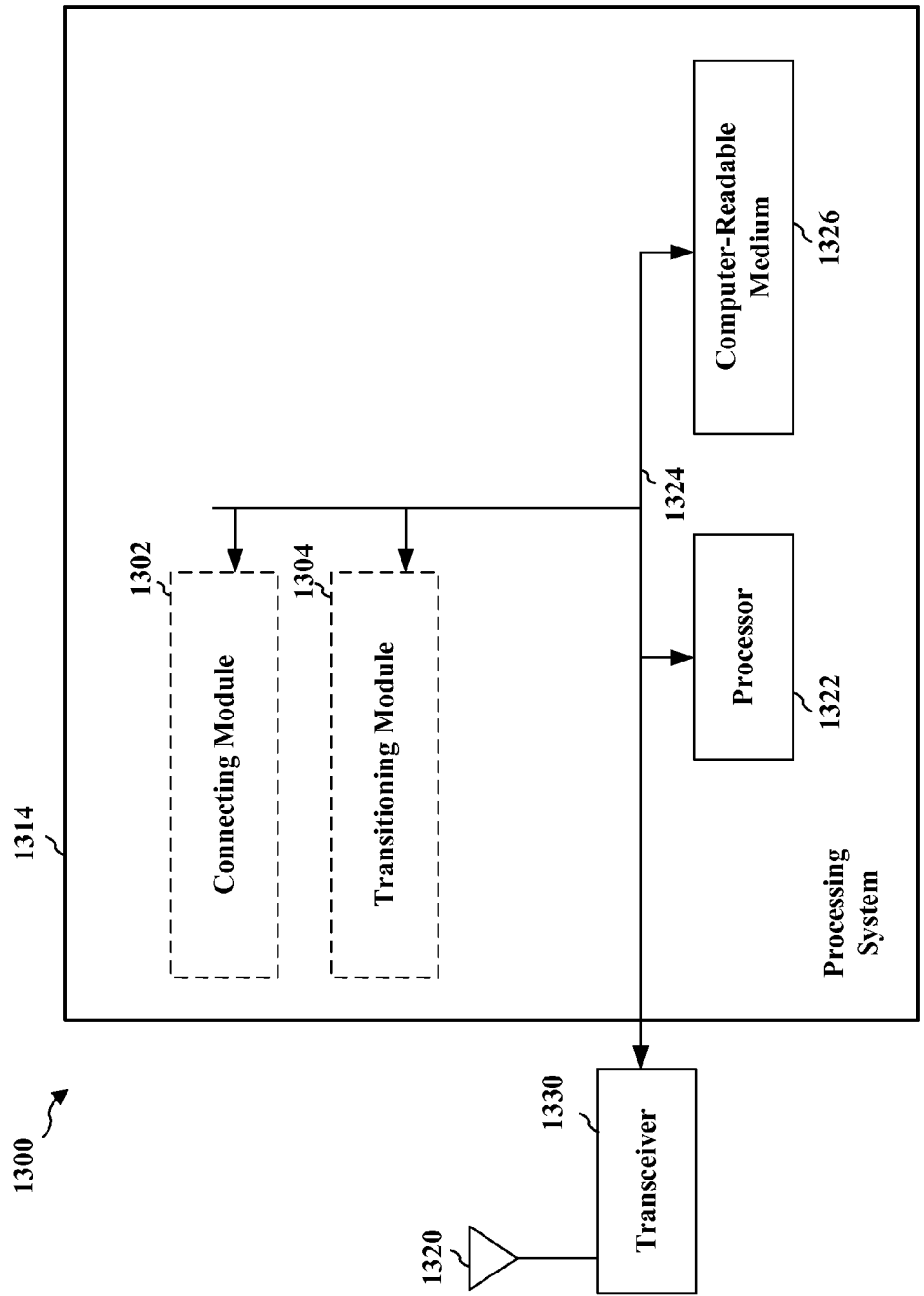

FIG. 13 is a diagram illustrating an example of a hardware implementation for an apparatus 1300 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1322 the modules 1302, 1304 and the computer-readable medium 1326. The bus 1324 may also link various other circuits such as timing sources, peripherals, voltage regulators, and power management circuits, which are well known in the art, and therefore, will not be described any further.

The apparatus includes a processing system 1314 coupled to a transceiver 1330. The transceiver 1330 is coupled to one or more antennas 1320. The transceiver 1330 enables communicating with various other apparatus over a transmission medium. The processing system 1314 includes a processor 1322 coupled to a computer-readable medium 1326. The processor 1322 is responsible for general processing, including the execution of software stored on the computer-readable medium 1326. The software, when executed by the processor 1322, causes the processing system 1314 to perform the various functions described for any particular apparatus. The computer-readable medium 1326 may also be used for storing data that is manipulated by the processor 1322 when executing software.

The processing system 1314 includes a connecting module 1302 for connecting to a legacy carrier type cell to obtain system information. The processing system 1314 also includes a transitioning module 1304 for transitioning to a dormant enhanced new carrier type cell based on the obtained system information. The modules may be software modules running in the processor 1322, resident/stored in the computer-readable medium 1326, one or more hardware modules coupled to the processor 1322, or some combination thereof. The processing system 1314 may be a component of the UE 650 and may include the memory 660, and/or the controller/processor 659.

Figure 14:
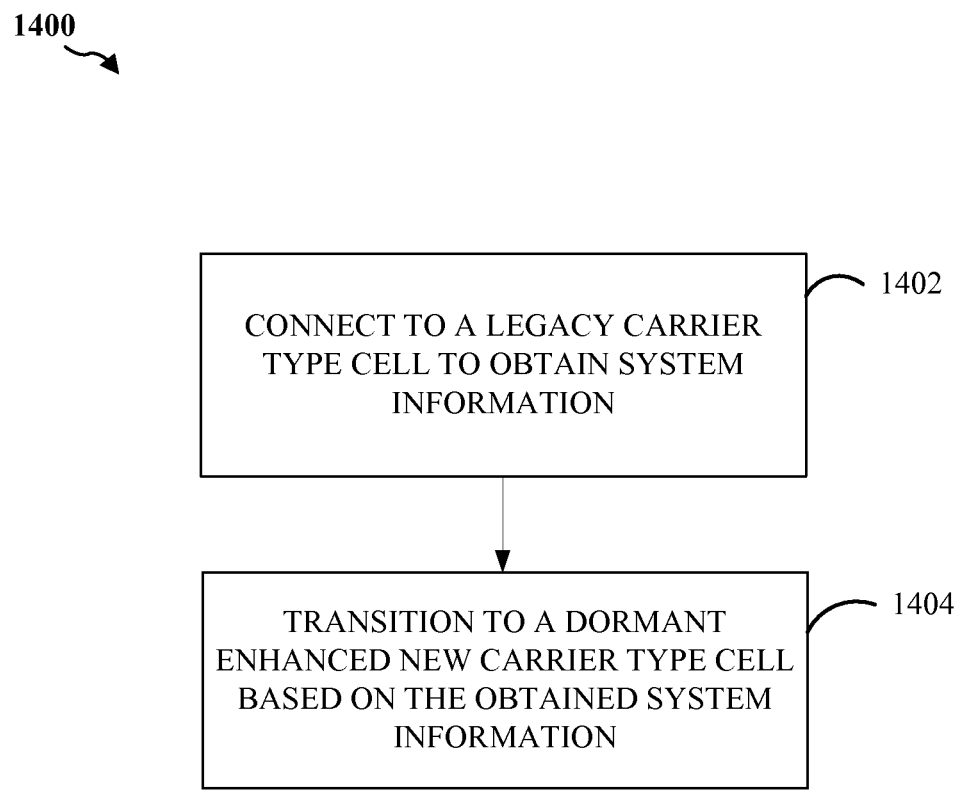

FIG. 14 illustrates a method 1400 for connecting to a specific carrier type. In block 1402, a UE connects to a legacy carrier type cell to obtain system information. The UE transitions to a dormant enhanced new carrier type cell based on the obtained system information in block 1404. Examples of system information, may include, but are not limited to, channel periodicity, timing information, bandwidth information, and/or antenna information.

In one configuration, the UE 650 is configured for wireless communication including means for connecting. In one aspect, the connecting means may be the controller/processor 659, memory 660, transmit processor 668, modulators 654, and/or antenna 652 configured to perform the functions recited by the connecting means. The UE 650 may be further configured to include a means for transitioning. In this aspect, the transitioning means may be the controller/processor 659, memory 660, transmit processor 668, modulators 654, and/or antenna 652 configured to perform the functions recited by the switching means. In another aspect, the aforementioned means may be any module or any apparatus configured to perform the functions recited by the aforementioned means.

Figure 15:
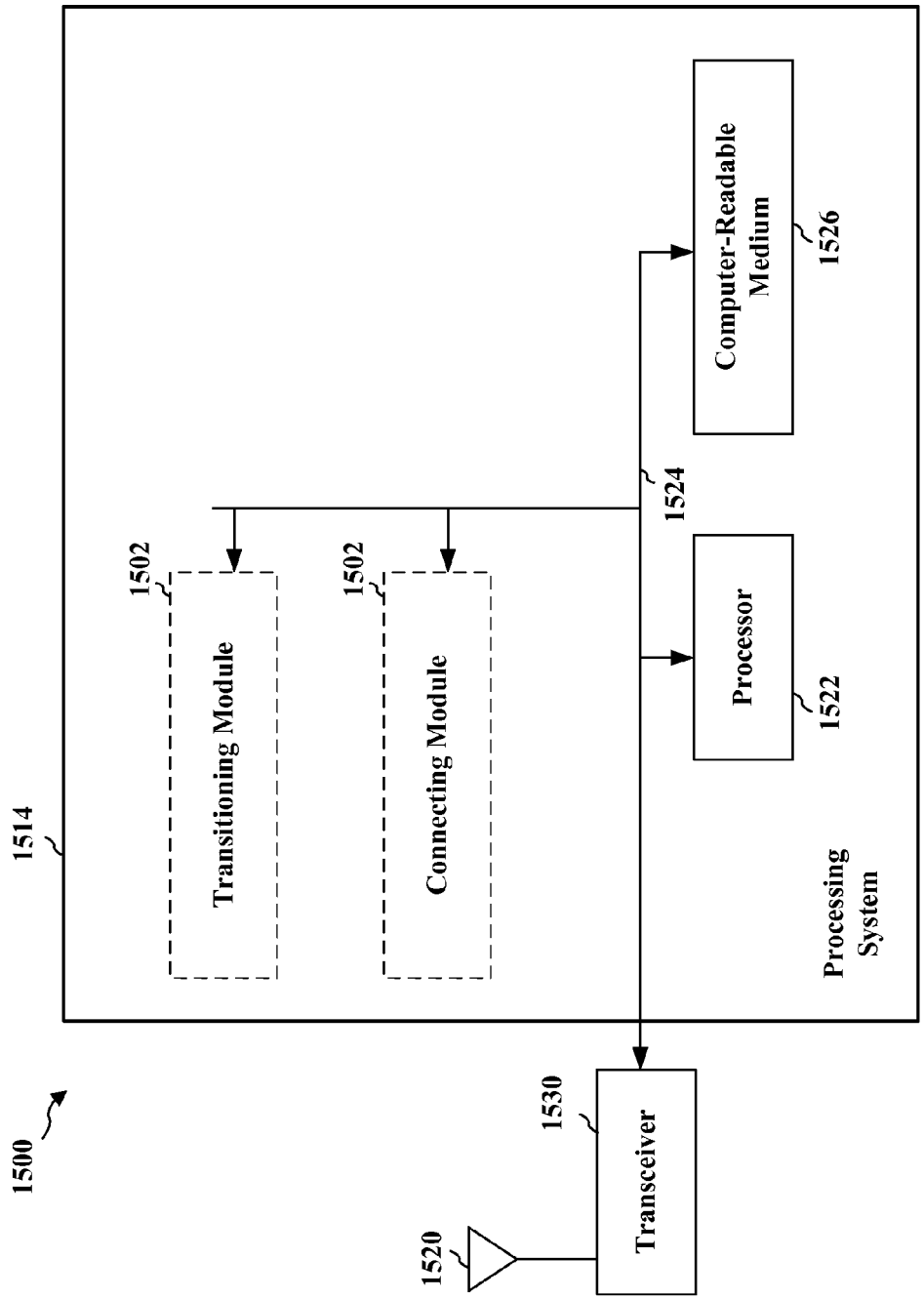

FIG. 15 is a diagram illustrating an example of a hardware implementation for an apparatus 1500 employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1522 the modules 1502, 1504, and the computer-readable medium 1526. The bus 1524 may also link various other circuits such as timing sources, peripherals, voltage regulators, and power management circuits, which are well known in the art, and therefore, will not be described any further.

The apparatus includes a processing system 1514 coupled to a transceiver 1530. The transceiver 1530 is coupled to one or more antennas 1520. The transceiver 1530 enables communicating with various other apparatus over a transmission medium. The processing system 1514 includes a processor 1522 coupled to a computer-readable medium 1526. The processor 1522 is responsible for general processing, including the execution of software stored on the computer-readable medium 1526. The software, when executed by the processor 1522, causes the processing system 1514 to perform the various functions described for any particular apparatus. The computer-readable medium 1526 may also be used for storing data that is manipulated by the processor 1522 when executing software.

The processing system 1514 includes a transitioning module 1502 for transitioning from an off state to an idle state. The processing system 1514 also includes a connecting module 1504 for connecting to an active enhanced new carrier type without first attaching to a legacy carrier type (LCT) when in the idle state. The modules may be software modules running in the processor 1522, resident/stored in the computer-readable medium 1526, one or more hardware modules coupled to the processor 1522, or some combination thereof. The processing system 1514 may be a component of the UE 650 and may include the memory 660, and/or the controller/processor 659.

Figure 16:
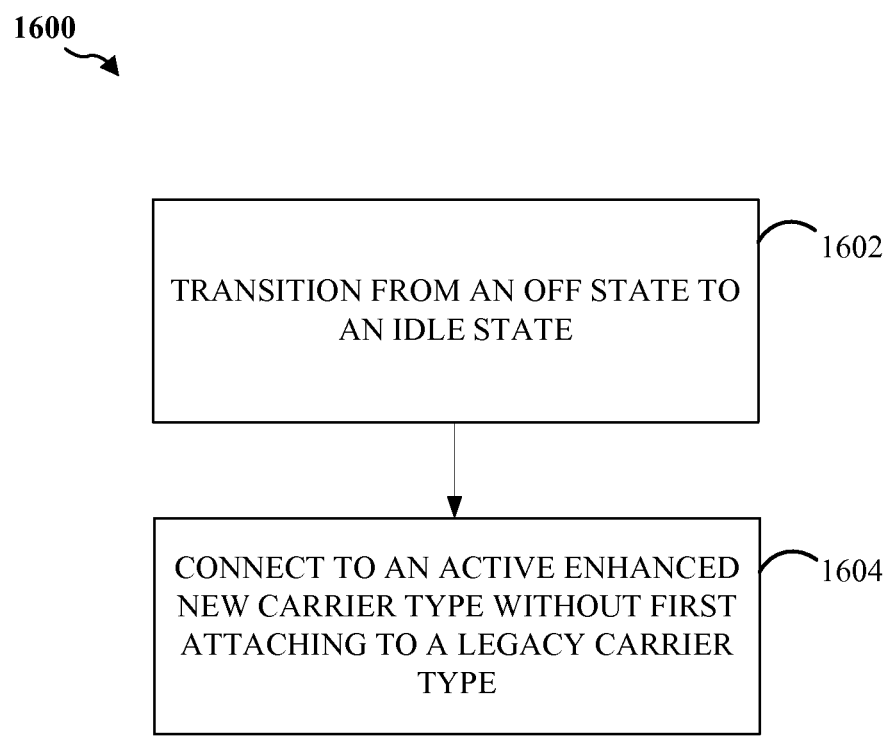

FIG. 16 illustrates a method 1600 for attaching to a specific carrier type. In block 1602, a UE transitioning from an off state to an idle state. Furthermore, in block 1604 the UE connects to an active enhanced new carrier type (eNCT) without first attaching to a legacy carrier type (LCT). In one configuration, the connection being established in a user equipment (UE) is in an idle state.

In one configuration, the UE 650 is configured for wireless communication including means for connecting. In one aspect, the connecting means may be the controller/processor 659, memory 660, transmit processor 668, modulators 654, and/or antenna 652 configured to perform the functions recited by the connecting means. In another aspect, the aforementioned means may be any module or any apparatus configured to perform the functions recited by the aforementioned means.

Figure 17:
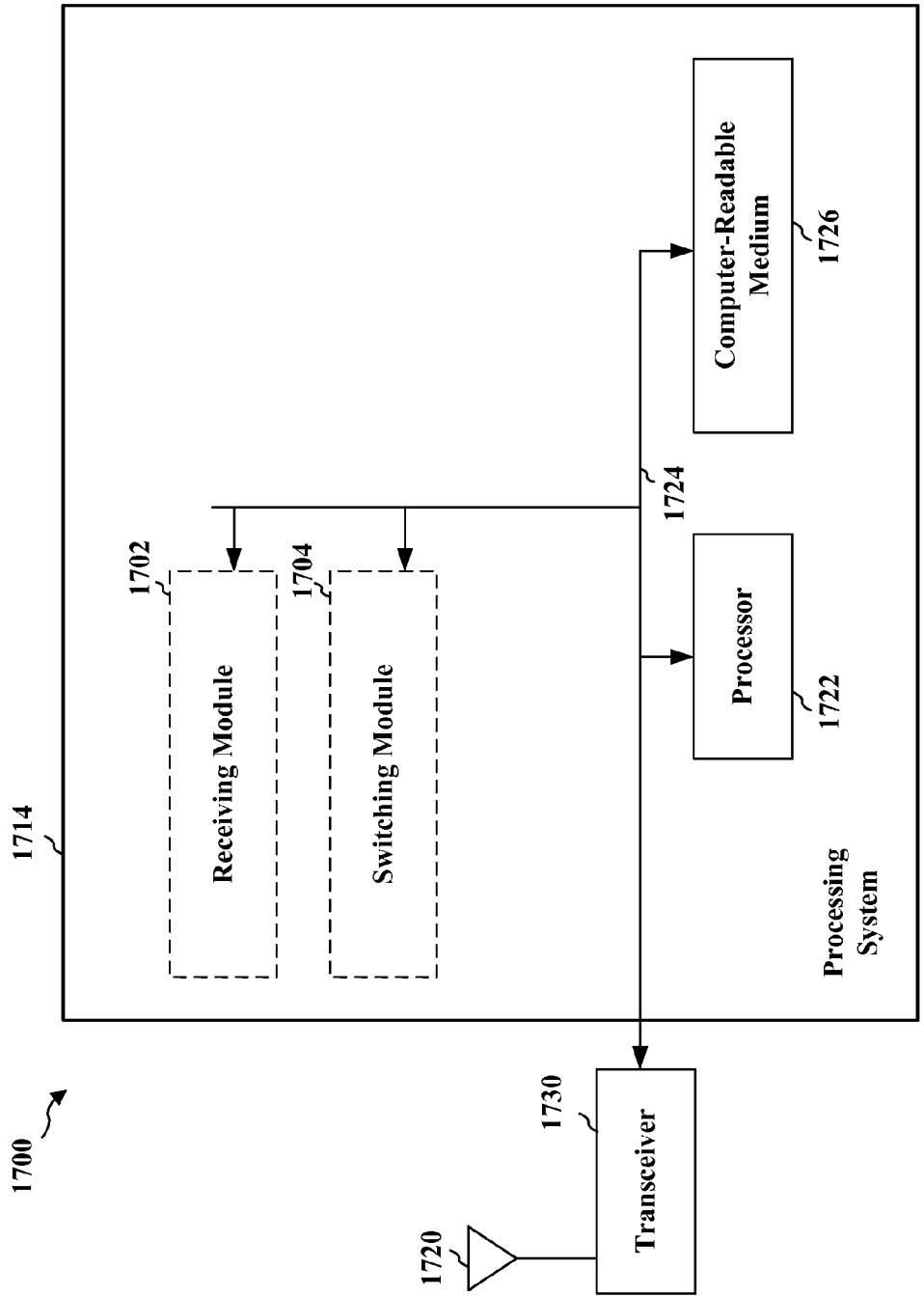

FIG. 17 is a diagram illustrating an example of a hardware implementation for an apparatus 1700 employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1722 the modules 1702, 1704, 1706 and the computer-readable medium 1726. The bus 1724 may also link various other circuits such as timing sources, peripherals, voltage regulators, and power management circuits, which are well known in the art, and therefore, will not be described any further.

The apparatus includes a processing system 1714 coupled to a transceiver 1730. The transceiver 1730 is coupled to one or more antennas 1720. The transceiver 1730 enables communicating with various other apparatus over a transmission medium. The processing system 1714 includes a processor 1722 coupled to a computer-readable medium 1726. The processor 1722 is responsible for general processing, including the execution of software stored on the computer-readable medium 1726. The software, when executed by the processor 1722, causes the processing system 1714 to perform the various functions described for any particular apparatus. The computer-readable medium 1726 may also be used for storing data that is manipulated by the processor 1722 when executing software.

The processing system 1714 includes a receiving module 1702 for receiving a physical random access channel signal. The processing system 1714 also includes a switching module 1704 for switching between a new carrier type mode and a legacy carrier type mode based at least in part on the received physical random access channel signal. The modules may be software modules running in the processor 1722, resident/stored in the computer-readable medium 1726, one or more hardware modules coupled to the processor 1722, or some combination thereof. The processing system 1714 may be a component of the eNodeB 610 may include the memory 646, and/or the controller/processor 675.

Figure 18:
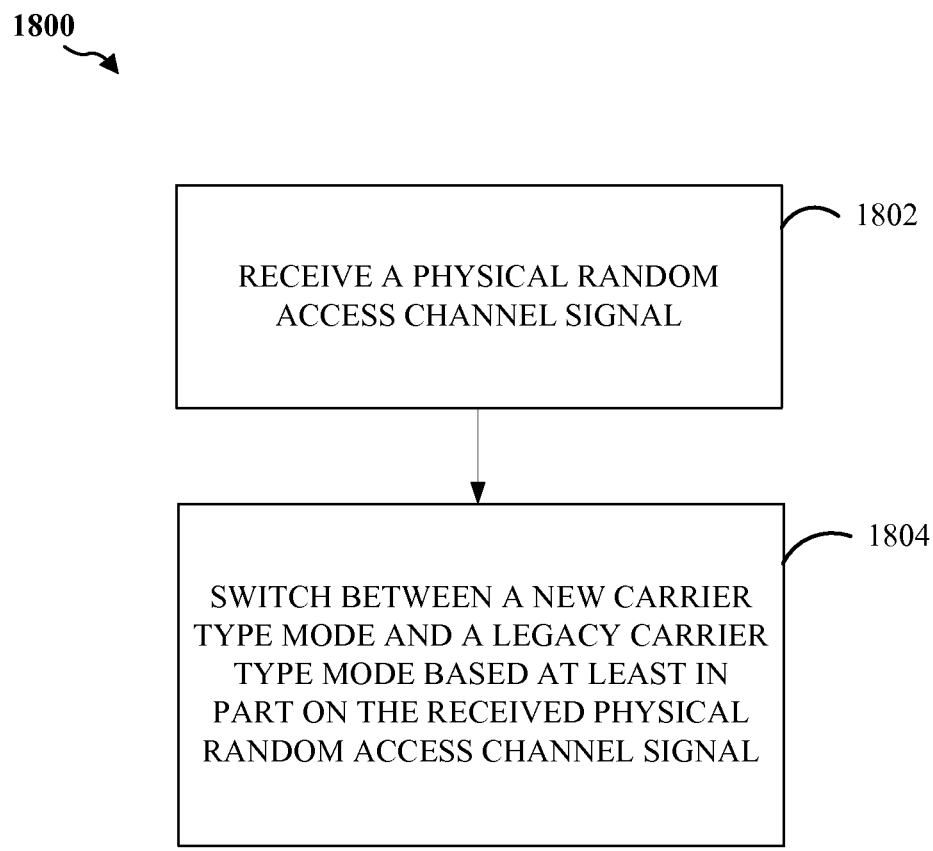

FIG. 18 illustrates a method 1800 for switching between carrier types. In block 1802, an eNodeB receives a physical random access channel (PRACH) signal. The eNodeB switches between a new carrier type mode and a legacy carrier type mode based at least in part on the received PRACH signal in block 1804.

In one configuration, the eNodeB 610 is configured for wireless communication including means for receiving. In one aspect, the receiving means may be the controller/processor 675, memory 646, receive processor 670, demodulators 618, and/or antenna 620 configured to perform the functions recited by the receiving means. The eNodeB 610 may be further configured to include a means for switching. In this aspect, the switching means may be the controller/processor 675 and/or memory 646 configured to perform the functions recited by the switching means. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication for a new carrier type (NCT) base station, comprising:
    transitioning, by the NCT base station, from an off state to a dormant state for transmitting downlink common signals and channels at a low duty cycle, the NCT base station undetectable while in the off state and detectable while in the dormant state;
    transmitting, from the NCT base station, the downlink common signals and channels at the low duty cycle while in the dormant state;
    remaining, by the NCT base station, in the dormant state beyond a time specified for the dormant state to receive uplink detection signals and channels in response to the downlink common signals and channels, the NCT base station intended to transition to the off state after the time specified for the dormant state; and
    receiving, at the NCT base station, uplink detection signals and channels at the low duty cycle, a timing and periodicity for the uplink detection signals and channels being associated with the downlink common signals and channels; and
    transmitting, from the NCT base station, downlink common signals and channels at a high duty cycle while in an active state.

2. The method of claim 1, in which the downlink common signals and channels transmitted at the low duty cycle comprise synchronization signals, physical broadcast channels (PBCHs), common reference signals (CRSs), cell detection signals (CDSs), or a combination thereof.

3. The method of claim 2, in which at least one cell detection signal comprises a unique cell ID, an access parameter, or a combination thereof.

4. The method of claim 1, in which the downlink common signals and channels transmitted at the high duty cycle comprise synchronization signals, physical broadcast channels (PBCHs), common reference signals (CRSs), system information blocks (SIBs), data channels, or a combination thereof.

5. The method of claim 4, in which the SIBs comprise common signal/channel periodicity, common signal/channel bandwidth, transmission antenna parameters, or combination thereof.

6. A new carrier type (NCT) base station configured for wireless communications, comprising:
    a memory; and
    at least one processor coupled to the memory, the at least one processor being configured:
        to transition from an off state to a dormant state for transmitting downlink common signals and channels at a low duty cycle, the NCT base station undetectable while in the off state and detectable while in the dormant state;
        to transmit the downlink common signals and channels at the low duty cycle while in the dormant state;
        to remain in the dormant state beyond a time specified for the dormant state to receive uplink detection signals and channels in response to the downlink common signals and channels, the NCT base station intended to transition to the off state after the time specified for the dormant state; and
        to receive uplink detection signals and channels at the low duty cycle, a timing and periodicity for the uplink detection signals and channels being associated with the downlink common signals and channels; and
        to transmit downlink common signals and channels at a high duty cycle while in an active state.

7. The NCT base station of claim 6, in which the downlink common signals and channels transmitted at the low duty cycle comprise synchronization signals, physical broadcast channels (PBCHs), common reference signals (CRSs), cell detection signals (CDSs), or a combination thereof.

8. The NCT base station of claim 7, in which at least one cell detection signal comprises a unique cell ID, an access parameter, or a combination thereof.

9. The NCT base station of claim 6, in which the downlink common signals and channels transmitted at the high duty cycle comprise synchronization signals, physical broadcast channels (PBCHs), common reference signals (CRSs), system information blocks (SIBs), data channels, or a combination thereof.

10. The NCT base station of claim 9, in which the SIBs comprise common signal/channel periodicity, common signal/channel bandwidth, transmission antenna parameters, or combination thereof.

11. An apparatus for wireless communications in a new carrier type (NCT) base station, comprising:
    means for transitioning, by the NCT base station, from an off state to a dormant state for transmitting downlink common signals and channels at a low duty cycle, the NCT base station undetectable while in the off state and detectable while in the dormant state;
    means for transmitting, from the NCT base station, the downlink common signals and channels at the low duty cycle while in the dormant state;
    means for remaining, by the NCT base station, in the dormant state beyond a time specified for the dormant state to receive uplink detection signals and channels in response to the downlink common signals and channels, the NCT base station intended to transition to the off state after the time specified for the dormant state; and
    means for receiving, at the NCT base station, uplink detection signals and channels at the low duty cycle, a timing and periodicity for the uplink detection signals and channels being associated with the downlink common signals and channels; and
    means for transmitting, from the NCT base station, downlink common signals and channels at a high duty cycle while in an active state.

12. A non-transitory computer-readable medium having program code recorded thereon for wireless communications in a new carrier type (NCT) base station, the program code comprising:

program code to transition, by the NCT base station, from an off state to a dormant state for transmitting downlink common signals and channels at a low duty cycle, the NCT base station undetectable while in the off state and detectable while in the dormant state;

program code to transmit, from the NCT base station, downlink common signals and channels at the low duty cycle while in the dormant state;

program code to remain, by the NCT base station, in the dormant state beyond a time specified for the dormant state to receive uplink detection signals and channels in response to the downlink common signals and channels, the NCT base station intended to transition to the off state after the time specified for the dormant state; and program code to receive, at the NCT base station, uplink detection signals and channels at the low duty cycle, a timing and periodicity for the uplink detection signals and channels being associated with the downlink common signals and channels; and program code to transmit, from the NCT base station, downlink common signals and channels at a high duty cycle while in an active state.

13. A method of wireless communication for a new carrier type (NCT) user equipment (UE), comprising:

receiving, at the NCT UE, downlink common signals and channels at a low duty cycle while an NCT base station is in a dormant state, the NCT base station being detectable by the NCT UE in the dormant state and undetectable while in an off state;

transmitting, from the NCT UE, uplink detection signals and channels at a low duty cycle in response to the received downlink common signals and channels, a timing and periodicity for the uplink detection signals and channels being associated with the downlink common signals and channels such that the NCT base station is intended to remain in the dormant state beyond a time specified for the dormant state to receive the uplink detection signals and channels; and receiving, at the NCT UE, downlink common signals and channels at a high duty cycle while the NCT base station is in an active state.

14. The method of claim 13, in which the downlink common signals and channels received at the low duty cycle comprise synchronization signals, physical broadcast channels (PBCHs), common reference signals (CRSs), cell detection signals (CDSs), or a combination thereof.

15. The method of claim 14, in which at least one cell detection signal comprises a unique cell ID, an access parameter, or a combination thereof.

16. The method of claim 13, in which the downlink common signals and channels transmitted at the high duty cycle comprise synchronization signals, physical broadcast channels (PBCHs), common reference signals (CRSs), system information blocks (SIBs), data channels, or a combination thereof.

17. The method of claim 16, in which the SIBs comprise common signal/channel periodicity, common signal/channel bandwidth, transmission antenna parameters, or a combination thereof.

18. A new carrier type (NCT) user equipment (UE), the NCT UE comprising:
a memory; and
at least one processor coupled to the memory, the at least one processor configured:
to receive downlink common signals and channels at a low duty cycle while an NCT base station is in a dormant state, the NCT base station being detectable by the NCT UE in the dormant state and undetectable while in an off state;
to transmit uplink detection signals and channels at a low duty cycle in response to the received downlink common signals and channels, a timing and periodicity for the uplink detection signals and channels being associated with the downlink common signals and channels such that the NCT base station is intended to remain in the dormant state beyond a time specified for the dormant state to receive the uplink detection signals and channels; and
to receive downlink common signals and channels at a high duty cycle while the NCT base station is in an active state.

19. The NCT UE of claim 18, in which the downlink common signals and channels received at the low duty cycle comprise synchronization signals, physical broadcast channels (PBCHs), common reference signals (CRSs), cell detection signals (CDSs), or a combination thereof.

20. The NCT UE of claim 19, in which at least one cell detection signal comprises a unique cell ID, an access parameter, or a combination thereof.

21. The NCT UE of claim 18, in which the downlink common signals and channels transmitted at the high duty cycle comprise synchronization signals, physical broadcast channels (PBCHs), common reference signals (CRSs), system information blocks (SIBs), data channels, or a combination thereof.

22. The NCT UE of claim 21, in which the SIBs comprise common signal/channel periodicity, common signal/channel bandwidth, transmission antenna parameters, or a combination thereof.

23. An apparatus for wireless communication, comprising:

receiving, at a new carrier type (NCT) user equipment (UE), downlink common signals and channels at a low duty cycle while an NCT base station is in a dormant state, the NCT base station being detectable by the NCT UE in the dormant state and undetectable while in an off state;

transmitting, from the NCT UE, uplink detection signals and channels at a low duty cycle in response to the received downlink common signals and channels, a timing and periodicity for the uplink detection signals and channels being associated with the downlink common signals and channels such that the NCT base station is intended to remain in the dormant state beyond a time specified for the dormant state to receive the uplink detection signals and channels; and receiving, at the NCT UE, downlink common signals and channels at a high duty cycle while the NCT base station is in an active state.

24. The apparatus of claim 23, in which the downlink common signals and channels received at the low duty cycle comprise synchronization signals, physical broadcast channels (PBCHs), common reference signals (CRSs), cell detection signals (CDSs), or a combination thereof.

25. The apparatus of claim 24, in which at least one cell detection signal comprises a unique cell ID, an access parameter, or a combination thereof.

26. The apparatus of claim 23, in which the downlink common signals and channels transmitted at the high duty cycle comprise synchronization signals, physical broadcast channels (PBCHs), common reference signals (CRSs), system information blocks (SIBs), data channels, or a combination thereof.

27. The apparatus of claim 26, in which the SIBs comprise common signal/channel periodicity, common signal channel bandwidth, transmission antenna parameters, or a combination thereof.

28. The apparatus of claim 23, in which the NCT base station remains awake beyond a time specified for transmitting the downlink common signals and channels after transmitting the downlink common signals and channels.

29. A non-transitory computer-readable medium having program code recorded thereon, the program code comprising:
  program code to receive, at a new carrier type (NCT) user equipment (UE), downlink common signals and channels at a low duty cycle while an NCT base station is in a dormant state, the NCT base station being detectable by the NCT UE in the dormant state and undetectable while in an off state;
  program code to transmit, from the NCT UE, uplink detection signals and channels at a low duty cycle in response to the received downlink common signals and channels, a timing and periodicity for the uplink detection signals and channels being associated with the downlink common signals and channels such that the NCT base station is intended to remain in the dormant state beyond a time specified for the dormant state to receive the uplink detection signals and channels; and
  program code to receive, at the NCT UE, downlink common signals and channels at a high duty cycle while the NCT base station is in an active state.

30. The non-transitory computer-readable medium of claim 29, in which the downlink common signals and channels received at the low duty cycle comprise synchronization signals, physical broadcast channels (PBCHs), common reference signals (CRSs), cell detection signals (CDSs), or a combination thereof.

31. The non-transitory computer-readable medium of claim 30, in which at least one cell detection signal comprises a unique cell ID, an access parameter, or a combination thereof.

32. The non-transitory computer-readable medium of claim 29, in which the downlink common signals and channels transmitted at the high duty cycle comprise synchronization signals, physical broadcast channels (PBCHs), common reference signals (CRSs), system information blocks (SIBs), data channels, or a combination thereof.

33. The non-transitory computer-readable medium of claim 32, in which the SIBs comprise common signal/channel periodicity, common signal/channel bandwidth, transmission antenna parameters, or a combination thereof.

34. The non-transitory computer-readable medium of claim 29, in which the NCT base station remains awake beyond a time specified for transmitting the downlink common signals and channels after transmitting the downlink common signals and channels.

* * * * *